No. 640,421. Patented Jan. 2, 1900.
A. G. SHEAK.
WATER FILTER.
(Application filed Sept. 6, 1898.)
(No Model.) 2 Sheets—Sheet 1.
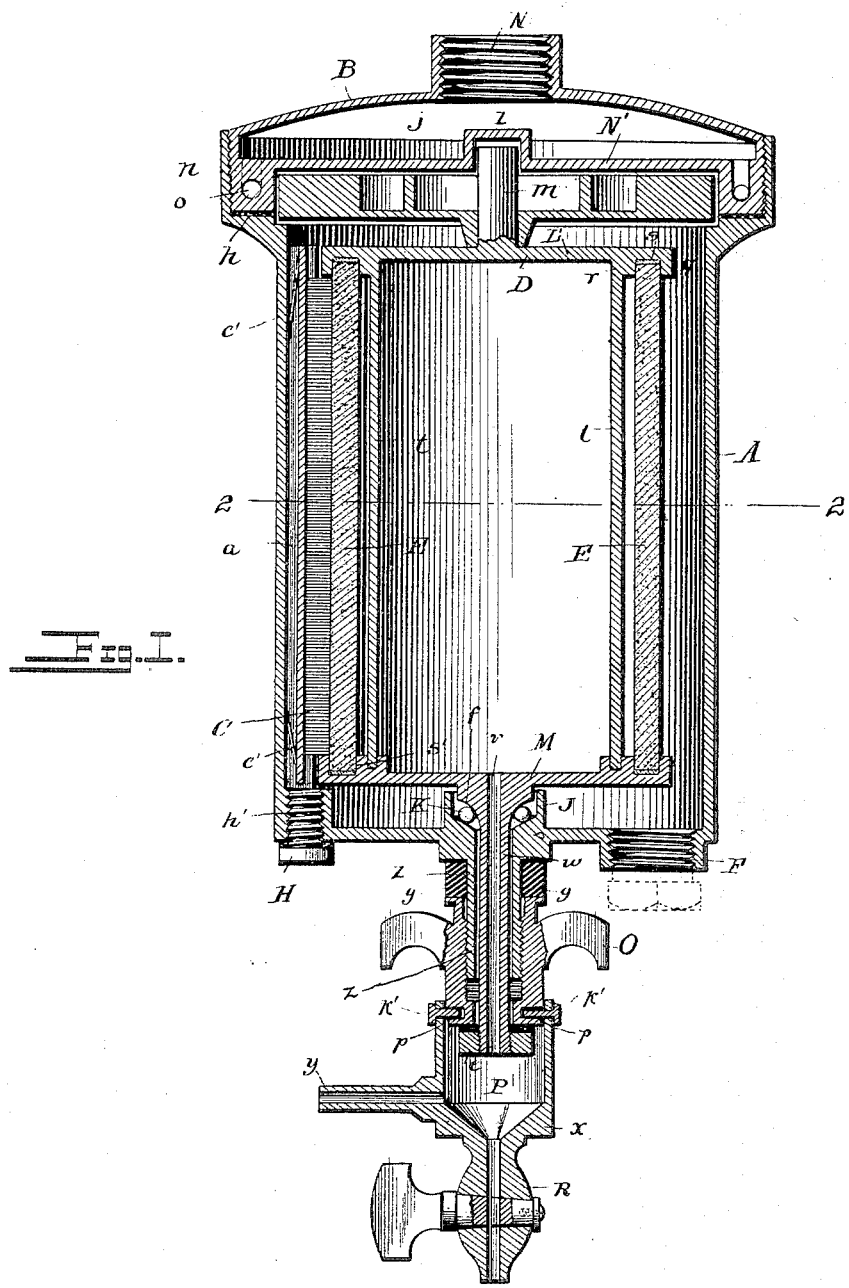
Witnesses
J. E. Alden
J. F. Riley
Andrew G. Sheak, Inventor
By his Attorneys,
C. A. Snow & Co.

No. 640,421. Patented Jan. 2, 1900.
A. G. SHEAK.
WATER FILTER.
(Application filed Sept. 6, 1898.)
(No Model.) 2 Sheets—Sheet 2.
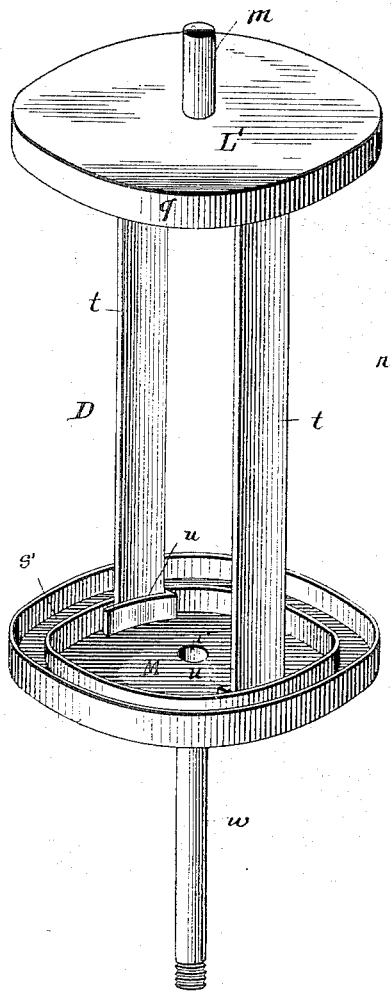
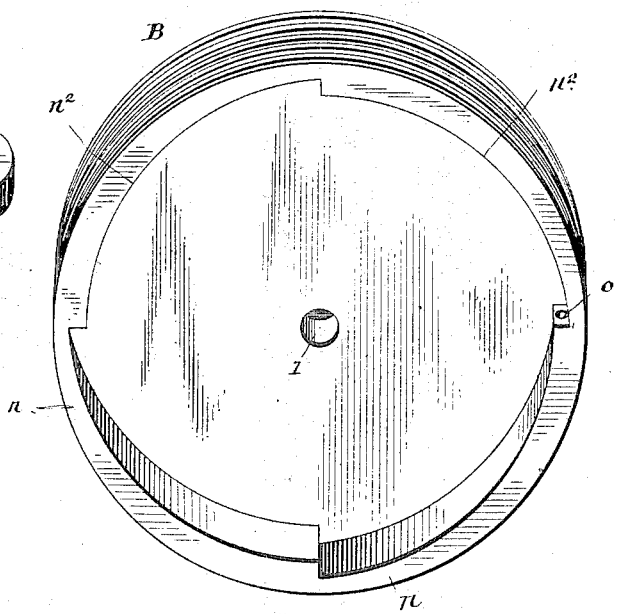
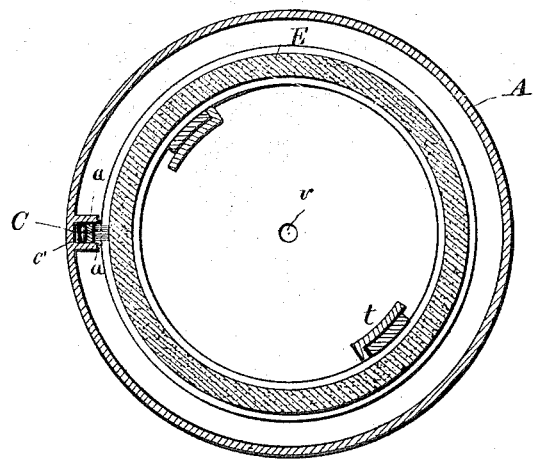
Witnesses
F. E. Alden
H. J. Riley
Andrew G. Sheak, Inventor.
By his Attorneys,
C. A. Snow & Co.

UNITED STATES PATENT OFFICE.

ANDREW G. SHEAK, OF BINGHAMTON, NEW YORK, ASSIGNOR TO ABBIE J. SHEAK, OF SAME PLACE.

WATER-FILTER.

SPECIFICATION forming part of Letters Patent No. 640,421, dated January 2, 1900.

Application filed September 6, 1898. Serial No. 690,278. (No model.)

*To all whom it may concern:*

Be it known that I, ANDREW G. SHEAK, a citizen of the United States, residing at Binghamton, in the county of Broome and State of New York, have invented a new and useful Water-Filter, of which the following is a specification.

The invention relates to improvements in water-filters.

The object of the present invention is to improve the construction of that class of water-filters in which natural or artificial stone is employed as a filtering medium and to provide a simple, inexpensive, and efficient one designed to be used in connection with a water service or supply pipe and adapted to filter water in large and small quantities and capable of cleaning itself automatically, and thereby obviating the necessity of removing it and taking it apart to accomplish this result.

The invention consists in the construction and novel combination and arrangement of parts hereinafter fully described, illustrated in the accompanying drawings, and pointed out in the claims hereto appended.

In the drawings, Figure 1 is a vertical sectional view of a water-filter constructed in accordance with this invention. Fig. 2 is a horizontal sectional view on line 2 2 of Fig. 1. Fig. 3 is a detail view of the frame which supports the filtering-cylinder. Fig. 4 is a detail view of the cover.

Like letters of reference designate corresponding parts in all the figures of the drawings.

A designates an outer cylindrical casing provided at its upper end, which is enlarged, with interior screw-threads, which are engaged by corresponding screw-threads of a hollow cover B, fitting within the enlarged upper end of the casing and bearing against and supported by the shoulder or seat formed by such enlargement. This shoulder or seat $h$ receives a suitable packing, which is interposed between the same and the cover to form a water-tight joint and prevent the escape of water from the top of the filter. The casing is provided on its interior with parallel vertical flanges $a$, forming a vertical groove or way adapted for the reception of a brush C and capable of holding the same in operative position. From the center of the bottom of the casing depends a tube $z$, having an exteriorly-threaded lower end, and around the opening at the upper end of the tube is a socket J, forming a race for a series of antifriction-balls K, upon which rests and revolves a frame D, which carries a filtering cylinder or casing E. The casing A is provided near its outer edge with an opening F, located at the bottom of the said casing and provided with a depending threaded flange adapted to receive a faucet or a plug which is designed to provide for a flow of water through the opening F for a purpose hereinafter described. The bottom of the casing is also provided with a threaded opening located directly beneath the groove or way formed by the parallel flanges of the casing, and this opening, which receives a removable plug H, provides for the introduction and removal of the brush C and enables a new brush to be supplied when necessary. The plug H, which fits in the opening $h'$, is provided with a head located at its lower end and forming a seat for a suitable packing.

The cover B, which is hollow, forms an interior chamber $j$ and is provided at its top with an opening N, interiorly threaded and adapted to screw on a water-pipe. The bottom or lower wall N' is inwardly or upwardly offset and is provided at its center with a socket $l$, forming a bearing for a shaft or journal $m$ of the frame D. The inwardly or upwardly offset bottom N' of the cap or cover of the casing forms a lower recess, in which is arranged a water-wheel L and which is substantially circular. The walls of the recess formed by the depending annular portion of the cap or cover consist of a series of tapering portions $n$, forming radially-arranged shoulders and provided with openings or passages $o$, extending from the interior chamber $j$ and having their lower terminals arranged to eject the water horizontally. The curved faces $n^2$ extend gradually inwardly and are adapted to direct the water discharged from the openings $o$ against the water-wheel, whereby the latter will be rotated. The streams of water ejected from the passages or openings $o$ are delivered upon the water-wheel in a direction substantially tangential with relation to the same and to the casing, and as they are arranged at intervals, as clearly illustrated in Fig. 4 of the accompanying drawings, it will be clear that a positive rotation of the water-wheel is effected.

The frame D, which supports the inner filtering casing or cylinder, comprises an upper disk or plate L', a lower disk or plate M, and vertical bars $t$, connecting the top and bottom of the frame and located at opposite sides thereof, as clearly illustrated in Fig. 3 of the accompanying drawings; but the number and position of the bars may be varied, if desired. The shaft or journal $m$ projects upward from the top of the frame, which is provided on its lower face, at its periphery, with an annular groove $s$, formed by inner and outer concentric ribs or flanges $r$ and $q$ and receiving the upper edge of the filtering-cylinder E. The bottom of the frame is provided on its upper face with an annular groove $s'$, receiving the lower edge of the filtering-cylinder and formed by concentric flanges similar to the groove $s$ of the top of the frame. The connecting-bars $t$ are secured to or formed integral with the upper disk or plate L' and have their lower ends fitting in grooves $u$ of the lower disk or plate M, and these bars are of sufficient length to prevent the top and bottom of the frame from exerting any strain on the filtering-cylinder. The grooves are designed to be filled with suitable impermeable cement, which secures the filtering cylinder or casing to the frame in such a manner that no water can enter the former except by percolating through the cylinder, whereby the water is thoroughly purified. The inner filtering-casing, which may be made of natural or artificial stone, porcelain, baked clay, or the like, may also be of any other desirable configuration which will permit it to rotate within an exterior casing.

The lower plate, which forms the bottom of the frame, is provided with a central opening $v$, from which depends a tube $w$, which extends through and revolves within the depending tube $z$. This inner tube $w$, which projects somewhat beyond the tube $z$, is provided with screw-threads at its lower end and receives a nut $e$, forming a seat for a suitable packing. The bottom of the frame is enlarged at the upper portion of the tube $w$ to provide a cone-bearing $f$ to rest on the antifriction-balls $k$.

An elastic packing $g$, of rubber or other suitable material, is placed on the upper portion of the tube $z$ and is engaged by a thumb-nut O, mounted on the threaded portion of the tube $z$ and bearing against the said packing $g$ with just sufficient pressure to make a water-tight joint. When the thumb-nut O is arranged in this position, it is engaged by the packing and the nut $e$. The thumb-nut O is provided with an annular groove forming a lower supporting-flange $p$, which is engaged by screws $k'$ of a water-distributer P.

The water-distributer P consists of a tube or pipe arranged on the lower end of the thumb-nut and swiveled to the same by the said screws $k'$. A stop-cock R depends from the lower portion of the tubular portion $x$, and a lateral pipe $y$ extends from one side of the distributer.

The brush C, which moves freely in the groove or way formed by the flanges $a$, is forced against the surface of the filtering cylinder or casing by springs $c'$, interposed between the back of the brush and the outer casing.

When it is desired to clean the filtering cylinder or casing, the stop-cock R is opened, the thumb-nut O is screwed up tightly against the elastic packing $g$ to raise its lower end from the seat of the nut $e$, and the faucet or plug at the opening F is opened or removed to permit the water inside the casing A to escape freely. The pressure being removed from the interior of the lower portion of the filter, the water is ejected forcibly through the openings $o$ of the cap or cover into the recess of the same, thereby causing the water-wheel, which is mounted on the shaft or spindle $m$, to revolve rapidly. This causes the filtering cylinder or casing to rotate against the brush, which, together with the flow of water, will rapidly and thoroughly cleanse the filter of all accumulations. The water which escapes around the tubes $w$ when the thumb-nut O is raised to remove the pressure from the nut $e$ flows through the open stop-cock R. After the filter is cleansed the shut-off or faucet is closed at F and the thumb-nut O is turned down firmly on the packing of the nut $e$. The stop-cock R is also closed and the water entering the filter must pass through the filtering cylinder or casing and may be conveyed by the pipe $y$ into a suitable receiving vessel or tank.

The invention has the following advantages: The filter, which is adapted to be attached to an ordinary service or supply pipe, is simple and comparatively inexpensive in construction, and the rotary filtering cylinder or casing and the means for rotating it are supported on ball-bearings, and the brush, which yieldingly engages the filtering cylinder or casing, is removably mounted in the device and may be readily replaced by a new brush when necessary. The filtering cylinder or casing through which the water percolates is supported within the frame, which has its top and bottom spaced apart, so that they do not exert any pressure or strain on the said cylinder or casing. The openings for ejecting the water upon the water-wheel have their discharge-orifices disposed tangentially, and the curved inner faces of the tapering portions $n$ of the cap serve to direct the streams of water inward against the water-wheel.

The lateral tube of the water-distributer is adapted to conduct the filtered water to a suitable receptacle or tank, where the filtered water may be stored, and the stop-cock R will enable filtered water to be readily obtained direct from the filter.

Changes in the form, proportion, size, and the minor details of construction within the scope of the appended claims may be resorted to without departing from the spirit or sacrificing any of the advantages of this invention, such as varying the configuration of the filtering casing or cylinder, the number and arrangement of the connecting-bars *t*, or providing a casing with a series of filtering casings or cylinders.

What is claimed is—

1. A filter comprising an exterior casing provided with upwardly-extending flanges forming a way, said casing having an opening located at the bottom of the said way, a brush mounted in the vertical way of the exterior casing and adapted to be passed through the said opening, whereby it is introduced into and removed from the casing, an interior revolving filtering-casing having the brush bearing against it, and a water-wheel connected with the inner filtering-casing and adapted to rotate the same, substantially as described.

2. A filter comprising an exterior casing, an interior rotary filtering-casing, a water-wheel connected with the inner filtering-casing and adapted to rotate the same, and a stationary cleaning device mounted on the exterior casing and located between the inner and outer casings and bearing against the inner one, substantially as described.

3. A filter comprising an exterior casing, a removable hollow cover provided with an opening for the attachment of a supply-pipe and having a recess at its bottom, said cover being provided around the recess with tangentially-arranged discharge-openings communicating with the interior of the cover, a rotary inner filtering-casing, and a wheel connected with the same and arranged within the said recess, substantially as described.

4. A filter comprising an exterior casing provided with a hollow top portion having an interior recess, said top portion being provided at the walls of the recess with tapering portions having curved inner faces and end shoulders and provided with discharge-openings, an inner filtering-casing, and a wheel connected with the same and operating in the said recess, substantially as described.

5. A filter comprising an exterior casing, a top or cover provided with an interior chamber and having a recess at its lower face forming a depending annular flange having a series of tapering portions presenting inner curved faces and straight substantially radial end faces, said cover or top being provided with openings or passages extending from its interior to the ends of the tapering portions, an interior rotary filtering-casing, and a wheel operating in the said recess, substantially as described.

6. A filter comprising an exterior casing provided at its bottom with a socket, a hollow cap or cover provided with a socket and having a recess communicating with the interior of the cap or cover, an inner rotary filtering-casing journaled in the said sockets, and a water-wheel connected with the filtering-casing and operating in the said recess, substantially as described.

7. A filter comprising an exterior casing, an inner rotary supporting-frame composed of top and bottom portions, and connecting-bars spacing the same, a filtering-cylinder secured to the top and bottom portions of the frame, the said connecting-bars being of sufficient length to prevent the frame from exerting pressure on the filtering-cylinder, and means for rotating the cylinder, substantially as described.

8. A filter comprising an exterior casing, an interior rotary filtering-casing, a hollow cap or cover provided with an interior chamber and having discharge-openings, a rotary wheel connected with the filtering-casing and adapted to rotate the same, a distributing device communicating with the interior of the filtering-casing, and means for drawing off the water from the space between the inner and outer casings, substantially as and for the purpose described.

9. A filter comprising an exterior casing, an interior filtering-casing mounted in suitable bearings of the exterior casing, the latter being provided with an outlet communicating with the space between the inner and outer casings, a cleaning device fixed to the outer casing and bearing against the inner casing, a distributing device communicating with the interior of the filtering-casing, and a water-wheel connected with and adapted to rotate the same, substantially as described.

10. A filter comprising an exterior casing with a ball-bearing socket in the center of its bottom on the interior and a projecting tube on the exterior, an inner revolving filtering-casing having a tube extending through the said tube and projecting beyond the same and threaded, and a nut arranged on the projecting end of the inner tube and forming a seat for a packing, substantially as described.

11. A filter comprising an outer casing having a depending tube, an inner filtering-casing provided with a tube extending through and projecting beyond the said tube and having an exterior seat, an elastic packing mounted on the outer tube, a nut arranged on the latter and interposed between the elastic packing and the said seat, and adapted to compress the former to release the latter, and means for rotating the inner filtering-casing, substantially as described.

12. A filter comprising an outer casing having a depending tube, an inner rotary filtering-casing provided with a tube extending through and projecting beyond the said tube, a lower nut arranged on the inner tube, an elastic packing disposed on the outer tube, and an adjustable nut interposed between the said nut and the elastic packing and engaging the same and adapted to compress the latter to release the former, substantially as described.

13. A filter comprising an exterior casing provided with a vertical groove or way and having a ball-bearing socket at its bottom, an outer tube depending from the bottom of the casing, a brush arranged in the groove or way and provided with springs, an inner revolving filtering-chamber, balls arranged in the bearing-socket and supporting the filtering-chamber, a hollow removable cover, a water-wheel connected with the filtering-chamber at the top thereof, an inner tube depending from the filtering-chamber and extending through the outer tube, an elastic packing arranged on the outer tube, an adjustable thumb-nut mounted on the outer tube and engaging the packing, a nut arranged on the inner tube, and a water-distributer swiveled to the thumb-nut and provided with a stopcock and a tube, substantially as described.

ANDREW G. SHEAK.

Witnesses:
HARRISON C. PRICE,
JOHN A. BROWN.